(No Model.)
E. J. PALMER.
TOOL FOR TURNING ROUND RODS.
No. 430,144. Patented June 17, 1890.
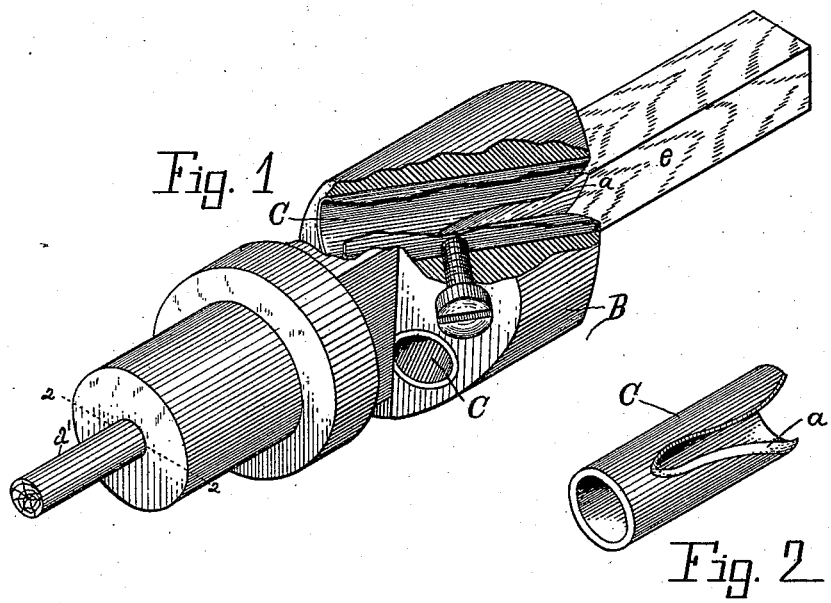
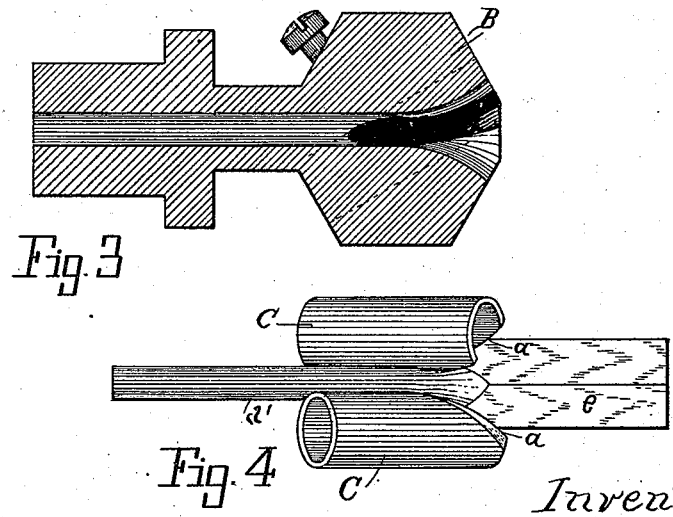
Witnesses:
Walter S. Wood
S. W. Burke
Inventor.
Edwin Jerome Palmer
By Lucius C. West
Att'y

UNITED STATES PATENT OFFICE.

EDWIN JEROME PALMER, OF KALAMAZOO, MICHIGAN.

TOOL FOR TURNING ROUND RODS.

SPECIFICATION forming part of Letters Patent No. 430,144, dated June 17, 1890.

Application filed July 1, 1889. Serial No. 316,258. (No model.)

*To all whom it may concern:*

Be it known that I, EDWIN JEROME PALMER, a citizen of the United States, residing at Kalamazoo, county of Kalamazoo, State of Michigan, have invented a new and useful Tool for Turning Round Rods, of which the following is a specification.

This invention relates to turning-tools which are revolved in lathes in a similar manner to reamers and dowel-tools.

This invention has for its object the peculiar construction and arrangement of the blades and head, substantially as below described and claimed.

In the drawings forming a part of this specification, Figure 1 is a perspective view of the tool in operation, parts being broken away; Fig. 2, a perspective of one of the cutters; Fig. 3, a section on line 2 2 in Fig. 1; and Fig. 4 is a view of lettered details in Fig. 1.

Referring to the letters marked on the drawings, B is the tool head or stock, which holds the cutter or cutters C, two being here shown in the tool; but more or less than two may be employed in a single tool.

Any suitable head may be employed, or chuck, as the case may be, to hold the peculiar cutter or cutters C. The head B has a longitudinal hole through its center, the front end of which hole nearly corresponds to the spirally-flaring cutting-edge $a$ of the cutter C. Thus the front end of said hole is of funnel form interiorly, to receive that part of the bar $e$ which is tapered by the cutter in the operation of forming the spindle part $i$ of said bar.

The cutters, as here shown, are made out of steel tubes in the following manner: Into holes which are drilled through the head B at crossing oblique angles I insert the tubes. Then with a reaming-tool, made for the purpose, but not here shown, I cut away that portion of the tubes which extends into the funnel-shaped mouth of the head, thus forming the cutters C, as in Fig. 2, having a cutting-edge $a$. I then remove the cutters C from the head B and run the reaming-tool in a little farther, and because of this treatment the cutting-edge $a$ of the cutters C, when the latter are replaced in the head, projects sufficiently far from the internal surface of the funnel-mouth to act upon the bar from which spindles or round rods $i$ are being formed. These cutters C may be made by other methods; but the foregoing description of how I make them will serve to more fully illustrate their shape, and will aid others to better understand their arrangement in the head B and their position relative to the bar $e$ when in use, Figs. 1 and 4.

The cutters may be retained in the head by any suitable means. As shown in Figs. 1 and 3, set-screws are employed for this purpose.

The cutters may represent fractional portions of a circle throughout their entire length when viewed in cross-section, or the rear end beyond the cutting-edge may be entirely tubular, Fig. 2.

The tool may be of any desired size for turning round rods of different sizes.

In use the tool is revolved in a lathe and fed onto the bar $e$ like a hollow auger, and during this operation the shavings fly through the cutters, coming out at the rear end.

Having thus described the invention, I claim—

A tool for turning round rods, comprising the head having the central longitudinal hole and the opposite obliquely-angled holes and the cutters in said holes, said cutters being partially tubular in cross-section on a line which would intercept any portion of the cutting-edge, substantially as set forth.

In testimony of the foregoing I have hereunto subscribed my name in presence of two witnesses.

EDWIN JEROME PALMER.

Witnesses:
JOHN GALLIGAN,
D. K. McNAUGHTON.